(12) United States Patent
Martelli (10) Patent No.: US 11,105,603 B2
(45) Date of Patent: Aug. 31, 2021

(54) BIDIRECTIONAL MEASURING HEAD FOR DIMENSIONAL AND/OR GEOMETRIC CHECKING OF A MECHANICAL PIECE

(71) Applicant: MARPOSS SOCIETA'PER AZIONI, Bentivoglio (IT)

(72) Inventor: Samuele Martelli, Castello d'Argile (IT)

(73) Assignee: Marposs Societa' Per Azioni, Bentivoglio (IT)

( * ) Notice: Subject to any disclaimer, the term of this patent is extended or adjusted under 35 U.S.C. 154(b) by 234 days.

(21) Appl. No.: 16/485,608

(22) PCT Filed: Feb. 21, 2018

(86) PCT No.: PCT/EP2018/054286
§ 371 (c)(1),
(2) Date: Aug. 13, 2019

(87) PCT Pub. No.: WO2018/153921
PCT Pub. Date: Aug. 30, 2018

(65) Prior Publication Data
US 2019/0383593 A1   Dec. 19, 2019

(30) Foreign Application Priority Data

Feb. 24, 2017 (IT) .................. 102017000021025
Feb. 24, 2017 (IT) .................. 102017000021061

(51) Int. Cl.
*G01B 5/00* (2006.01)
*G01B 5/004* (2006.01)

(52) U.S. Cl.
CPC .......... *G01B 5/0016* (2013.01); *G01B 5/004* (2013.01)

(58) Field of Classification Search
USPC ....... 33/558, 1 M, 561; 73/862.043, 862.042
See application file for complete search history.

(56) References Cited

U.S. PATENT DOCUMENTS 4,523,383 A    6/1985  Rogers et al.
5,477,743 A  * 12/1995  Yanagisawa ............. B23Q 5/34
                                                    108/143

(Continued)

FOREIGN PATENT DOCUMENTS

DE           37 25 205 A1    2/1989
WO    WO-2020115621 A1 *  6/2020  ............... G01B 5/20

*Primary Examiner* — Christopher W Fulton
(74) *Attorney, Agent, or Firm* — Blank Rome LLP (57) ABSTRACT

Bidirectional measuring head (1) comprising: a stationary frame (12), a feeler (2), a kinematic motion assembly (13) which is supported by the stationary frame and carries the feeler to enable the feeler to move along two measuring directions (D1, D2) perpendicular to each other, and at least one position sensor (3a, 3b) that is mounted on the kinematic motion assembly and detects the position of the feeler along at least one measuring direction. The kinematic motion assembly has four columns, each of which runs perpendicular to the two measuring directions: a first column (14) is rigidly linked to the support frame, a second column (15) is adapted to translate along both measuring directions and supports the feeler, a third column (16) and a fourth column (7) each performs a displacement almost exclusively along one of the two measuring directions. The kinematic motion assembly may be a deformable mechanism. The kinematic motion assembly further comprises two balancing elements (60) each of which is hinged to the stationary frame so as to rotate around a rotation axis (33) perpendicular to the measuring directions and comprises one end which is mechanically constrained to the third column or the fourth column.

26 Claims, 10 Drawing Sheets

(56) References Cited

U.S. PATENT DOCUMENTS

| | | | |
|---|---|---|---|
| 7,152,331 B2 * | 12/2006 | Nakamura | G03F 7/70058 33/1 M |
| 2002/0020069 A1 * | 2/2002 | Bottinelli | B23Q 1/626 33/1 M |
| 2003/0213135 A1 * | 11/2003 | Kaneko | B23Q 1/34 33/1 M |
| 2004/0128848 A1 * | 7/2004 | Szenger | F16F 7/082 33/561 |
| 2004/0244208 A1 * | 12/2004 | Sawada | H02N 2/0095 33/1 M |
| 2004/0255696 A1 * | 12/2004 | Helmer | F16C 11/12 73/862.043 |
| 2005/0055839 A1 | 3/2005 | Brenner et al. | |
| 2006/0064884 A1 * | 3/2006 | Seo | G02B 27/646 33/1 M |
| 2006/0112578 A1 * | 6/2006 | Jordil | G01B 5/012 33/559 |
| 2016/0258733 A1 | 9/2016 | Shimaoka et al. | |

* cited by examiner

BIDIRECTIONAL MEASURING HEAD FOR DIMENSIONAL AND/OR GEOMETRIC CHECKING OF A MECHANICAL PIECE

TECHNICAL FIELD

The present invention relates to a bidirectional measuring head for dimensional and/or geometric checking of a mechanical piece.

BACKGROUND ART

A bidirectional measuring station (that is with two degrees of freedom) to carry out dimensional and/or geometric checking of a mechanical piece comprises a seat adapted to receive and block in a fixed position the mechanical piece, and a measuring head with a feeler which is mounted movably along two measuring directions perpendicular to each other (i.e. the probe has two degrees of freedom and is free to move on a plane), is resiliently pushed against the surface of the mechanical piece, and is coupled to two position sensors that detect the position of the feeler along the respective measuring directions.

A known measuring head with two degrees of freedom includes a first mechanism that is mounted on a stationary frame, has only one degree of freedom (i.e. it allows the linear displacement along a first measuring direction by deforming an elastic element that tends to keep the first mechanism in an intermediate balanced position) and is provided with a first position sensor, and a second mechanism which is mounted on the first mechanism (in particular on the movable part of the first mechanism), has only one degree of freedom (i.e. it allows the linear displacement along a second measuring direction perpendicular to the first measuring direction by deforming an elastic element which tends to keep the second mechanism in an intermediate balanced position) and is provided with a second position sensor. The probe is integral with the movable part of the second mechanism so as to be able to move along both the first measuring direction (due to the degree of freedom of the first mechanism) and the second measuring direction (due to the degree of freedom of the second mechanism).

Generally, each mechanism is a deformable mechanism (that is, it deforms its own shape to cause the linear displacement) and consists of an articulated parallelogram (that is, of four rods whose ends are hinged two by two, the two opposite rods having the same length).

Position sensors are used in two different ways: during the dimensional and/or geometric checking of the mechanical piece the position sensors are used to perform the necessary measurements, while during transits of the bidirectional measuring head (i.e. during the displacements of the bidirectional measuring head from a previous working position to the next working position) the position sensors are used to detect unexpected and unwanted impacts. In other words, during a transit of the bidirectional measuring head, the probe should not contact any type of obstacle (that is the transit path is set to avoid all expected and predictable obstacles). Consequently, if during a transit a position sensor of the bidirectional measuring head detects an (unexpected) displacement of the feeler, such (unexpected) displacement of the feeler is attributed to an impact against an unexpected obstacle, the displacement of the bidirectional measuring head is immediately interrupted, and a collision alarm requiring the intervention of a human operator is generated.

During the transit of the bidirectional measuring head, the accelerations (positive or negative) to which the bidirectional measurement head is subjected should not be too high, because a too high acceleration could lead to a significant inertial displacement (i.e. a displacement that is only due to forces of inertia) of the feeler that would be interpreted as a collision (and therefore would generate a false collision alarm).

A disadvantage of the known measuring head described above is that it is not symmetrical from the inertial point of view: during displacements of the measuring head along one of the measuring directions, the mass displaced along that measuring direction is about twice the mass displaced along the other measuring direction because the two mechanisms are arranged in series (that is to say, to move the first mechanism is necessary to move also the whole second mechanism). As a result, the displacement along a measuring direction has a different dynamic behavior from the displacement in the other measuring direction. This difference (inhomogeneity) in the dynamic behavior in the two measuring directions complicates the operations during both the dimensional and/or geometric checking of the mechanical piece and the transits, because it is always necessary to carry out a different control of the movements of the measuring head in the two measuring directions.

Moreover, in a measuring direction the inertia of the feeler is high (that is, the inertia of the first mechanism is high because it has to "carry" the whole second mechanism) and therefore during the transits the maximum permissible acceleration along this measuring direction is moderate. As a consequence, the transits are relatively slow (thus increasing the downtime during which the bidirectional measuring head does not perform measurements) at the expense of the overall efficiency of the checking process.

DESCRIPTION OF THE INVENTION

The object of the present invention is to provide a bidirectional measuring head for carrying out a dimensional and/or geometric checking of a mechanical piece, the measuring head being homogeneous from the inertial point of view, that is having identical behavior in different measuring directions and being at the same time easy and cheap to be implemented.

A further object of the present invention is to provide a suitably balanced measuring head which can be subjected to high accelerations and which is at the same time easy and cheap to be implemented.

The present invention provides a bidirectional measuring head to perform dimensional and/or geometric checking of a mechanical piece, as claimed by the attached claims.

BRIEF DESCRIPTION OF THE DRAWINGS

The present invention is now described with reference to the accompanying drawings, given by way of non-limiting example, wherein.

BEST MODE FOR CARRYING OUT THE INVENTION

Figure 1:
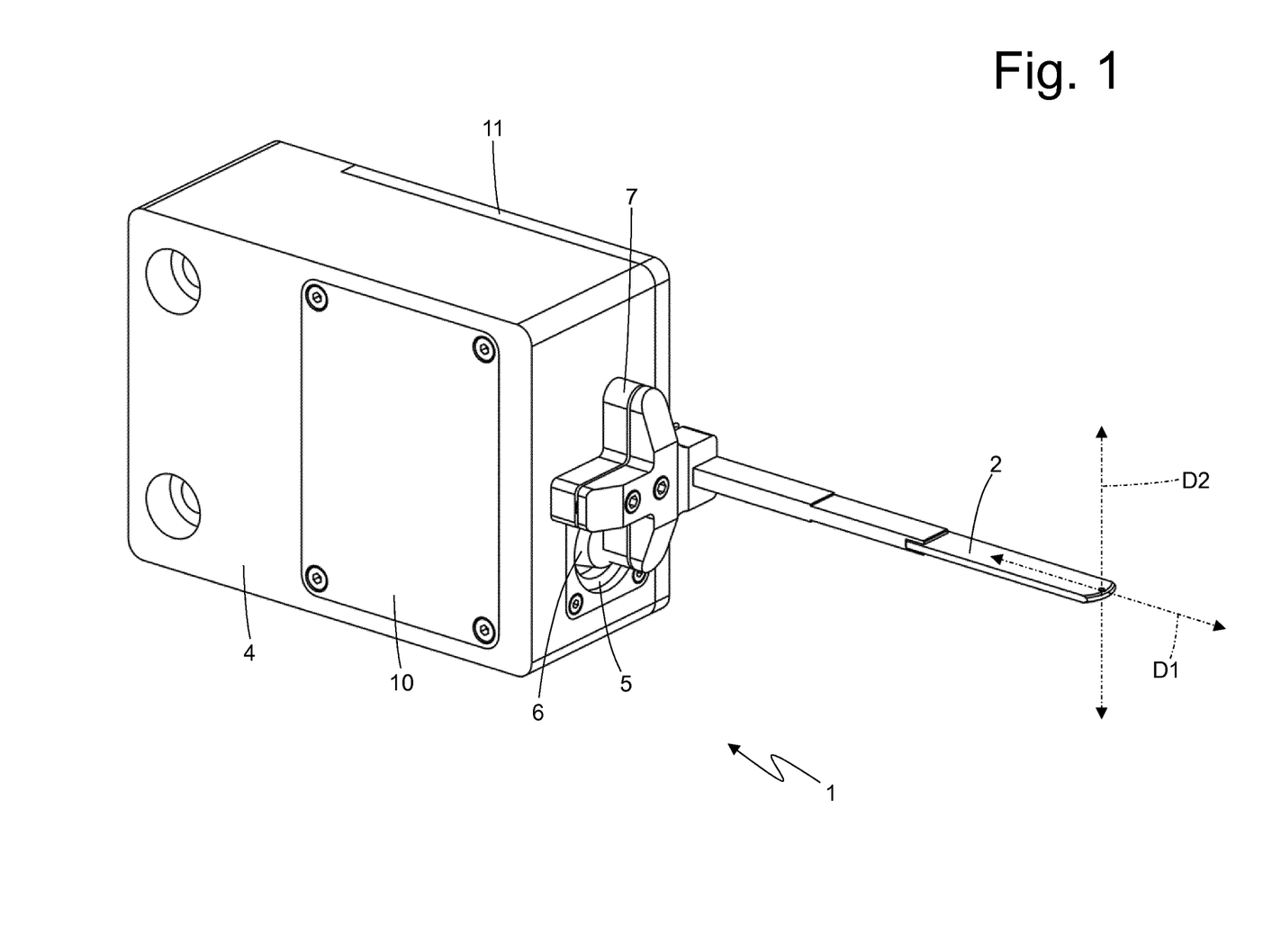
FIG. 1 is a perspective view of a bidirectional measuring head for dimensional and/or geometric checking of a mechanical piece according to the present invention.

In FIG. 1, the reference number 1 indicates as a whole a measuring head for carrying out dimensional and/or geometrical checking of a mechanical piece (not shown).

Figure 5:
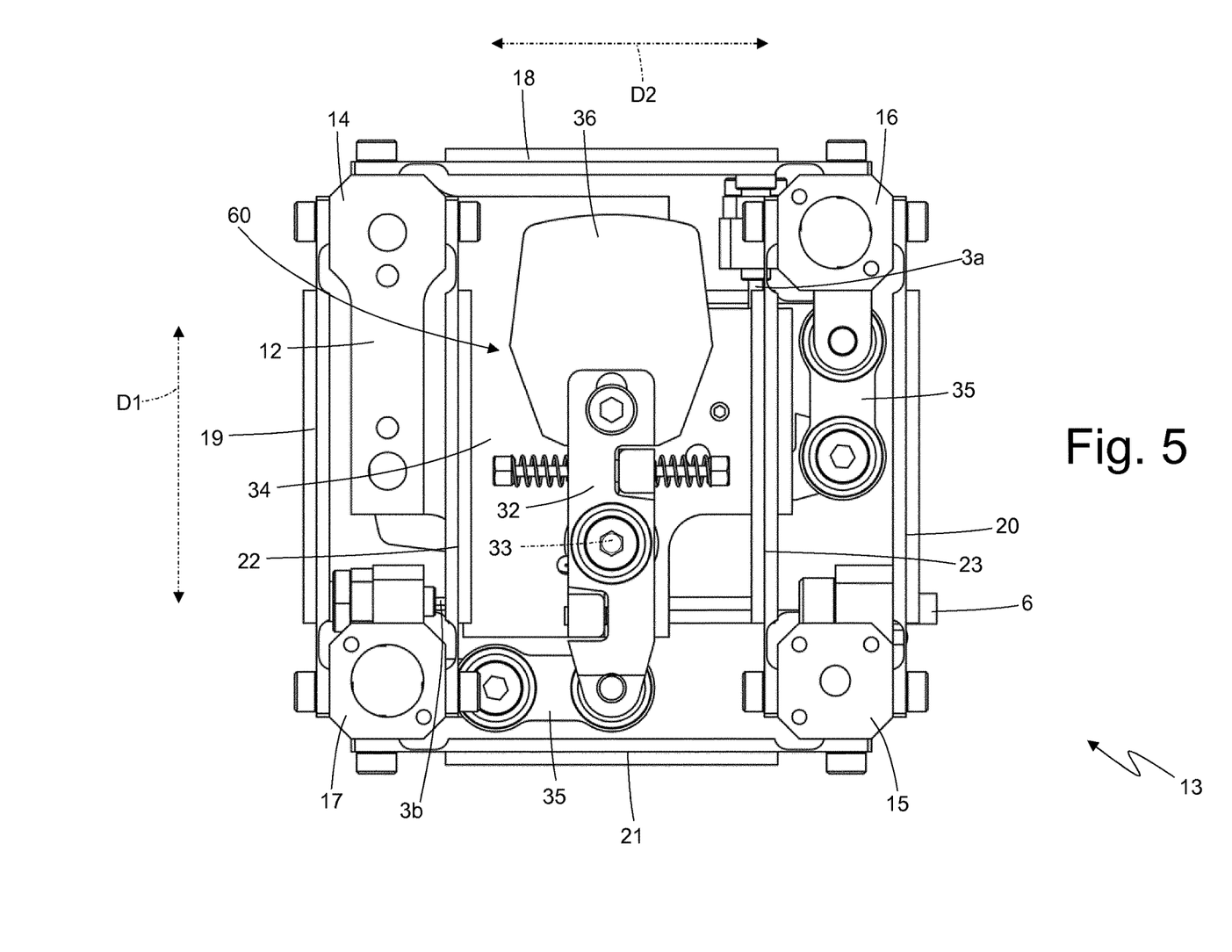
FIGS. 5 and 6 are two plan views, a top view and a bottom view respectively, of the deformable mechanism of FIGS. 3 and 4.
Figure 6:
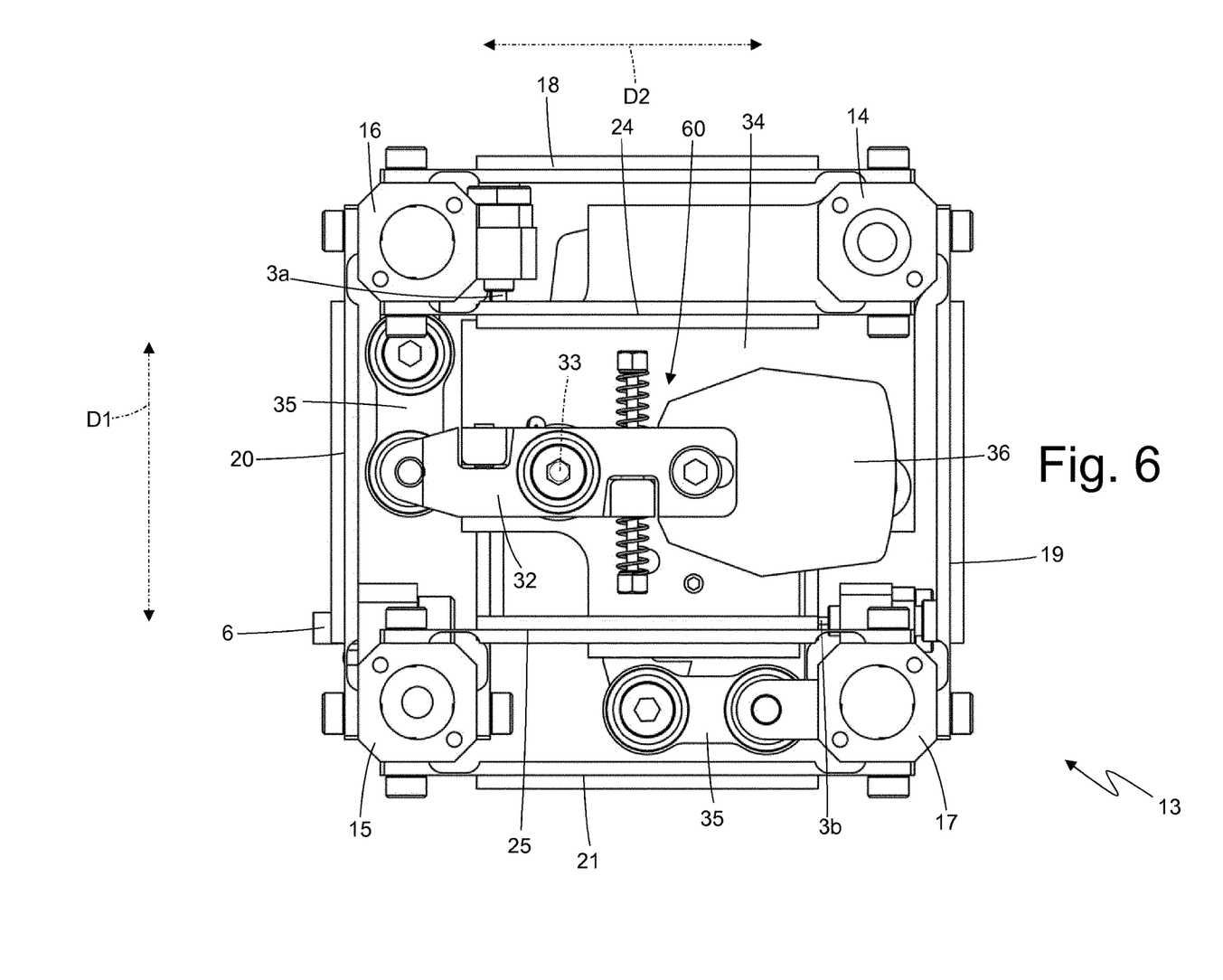

The measuring head 1 is typically part of a measuring station (not shown) to perform dimensional and/or geometric checking of a mechanical piece. The measuring station comprises a seat (not shown) for receiving and blocking the mechanical piece in a fixed position. Moreover, the measuring station comprises the measuring head 1, which is provided with a feeler 2 that is movably mounted along two measuring directions D1 and D2 perpendicular to each other (i.e. the feeler 2 is free to move in a plane and has two degrees of freedom), is pushed elastically against the surface of the mechanical piece, and is coupled to two position sensors 3a and 3b (shown in FIGS. 5 and 6) which detect the position of the feeler 2 along the corresponding measuring directions D1 and D2.

Figure 2:
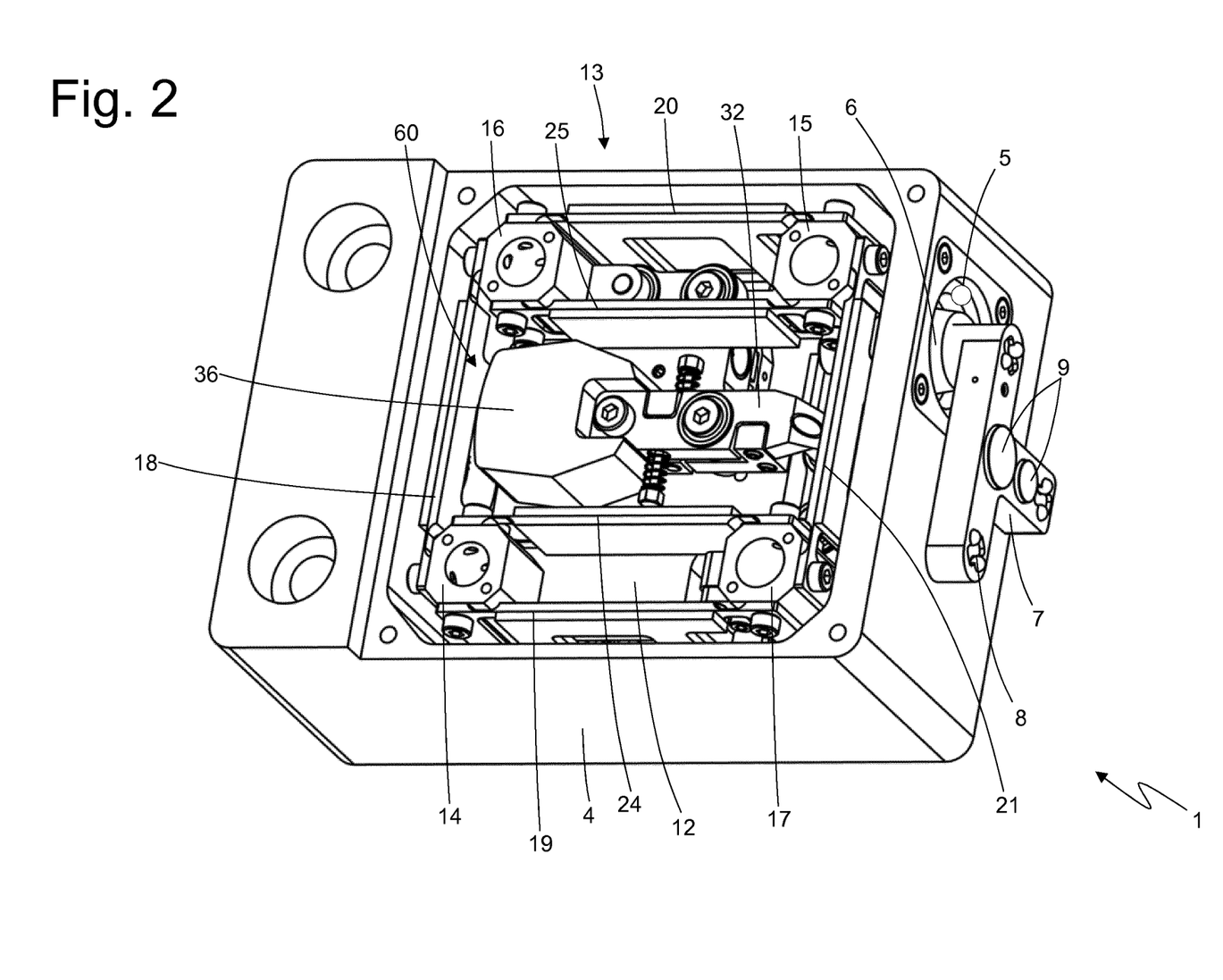
FIG. 2 is a perspective view of the measuring head of FIG. 1 where a cover and a feeler have been removed.
Figure 3:
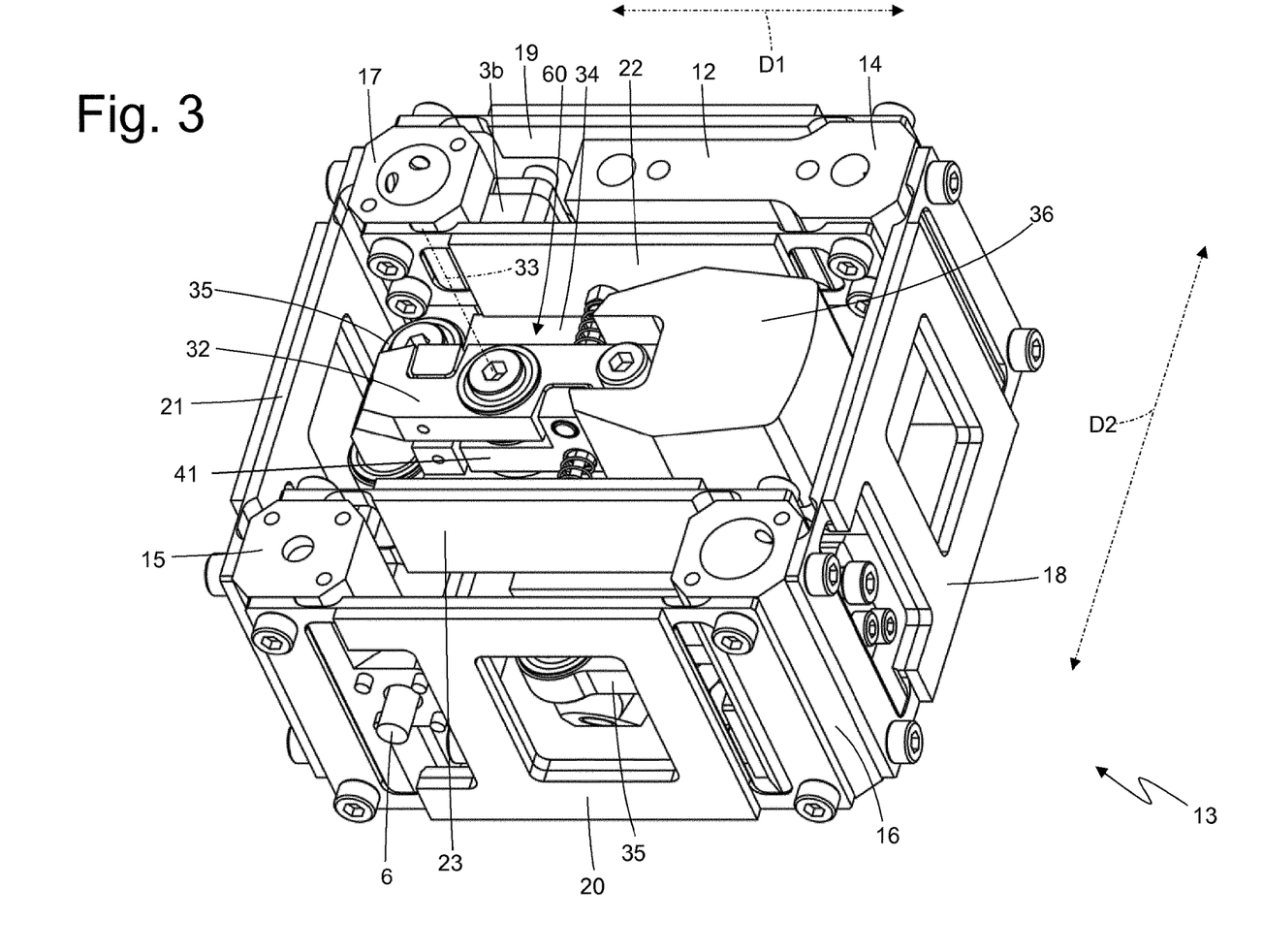
FIGS. 3 and 4 are two perspective views, a top view and a bottom view respectively, of a deformable mechanism of the measuring head of FIG. 1.
Figure 4:
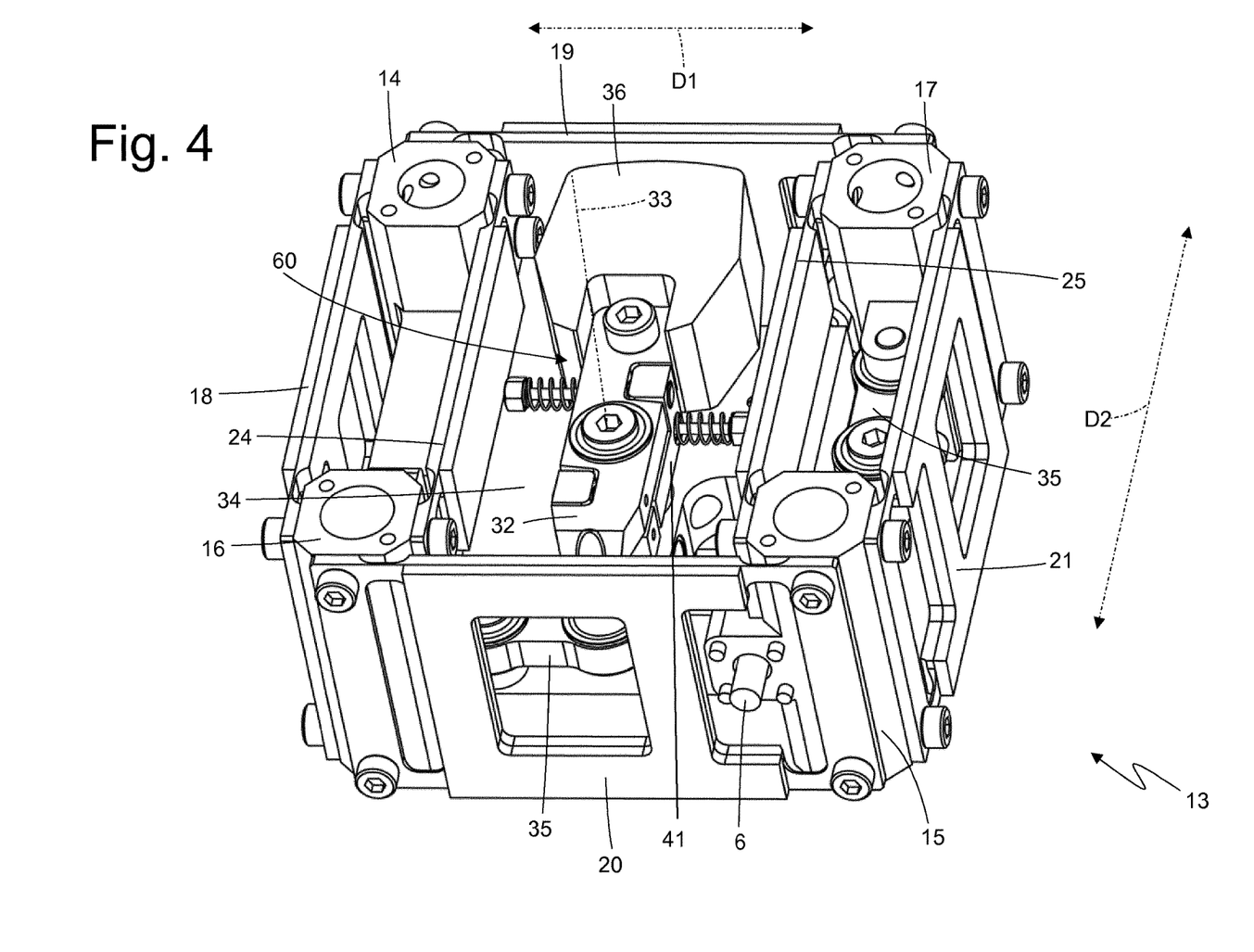

According to what is illustrated in FIG. 1, the measuring head 1 comprises a parallelepiped casing 4 which is made of metallic material (usually steel) and has a through opening 5 through which a rod 6 passes. One end of the rod 6 is external (i.e. it is placed outside the casing 4) and supports a seat 7 (better illustrated in FIG. 2) to which the feeler 2 is connected, for example hooked. As shown in FIG. 2, the feeler 2 is fastened to the seat 7 by means of a safety coupling having a positioning "tripod" comprising, for example but not exclusively, three pairs of balls 8 which partially protrude from the fastening surface of the seat 7 and three corresponding cylinders (not shown) integral with a base of the feeler 2 and housed between the pairs of balls 8. Furthermore, the seat 7 is provided with two magnets 9 which magnetically couple the base of the feeler 2 to the seat 7. The feeler 2 can be connected to the end of the rod 6 in a way different from what is illustrated in FIG. 2.

As shown in FIG. 1, the casing 4 includes two covers 10 and 11 which are fixed to the casing 4 by respective screws and can be removed to access the interior of the casing 4 (FIG. 2 illustrates the casing 4 without the cover 11). As shown in FIG. 2, the measuring head 1 comprises a stationary frame 12 which is arranged inside the casing 4 and is integral with (or rigidly constrained to) the casing 4 by means of screws (not shown). Furthermore, the measuring head 1 comprises a kinematic motion assembly 13 which is arranged inside the casing 4, is supported by the stationary frame 12 and carries the feeler 2 (i.e. it carries the rod 6 to which the feeler 2 is fixed) to enable the feeler 2 to move along the two measuring directions D1 and D2 (shown in FIG. 1) perpendicular to each other. In the illustrated embodiment, the kinematic motion assembly 13 is a deformable mechanism.

As illustrated in FIGS. 3-6, the deformable mechanism 13 comprises four columns 14-17, which are arranged at the vertices of a parallelogram (for example square in shape as shown in the figures). Each column 14-17 runs perpendicular to the two measuring directions D1 and D2, and has at least one external surface. In the preferred embodiment, each column 14-17 has four blunt surfaces, that is substantially flat surfaces. More specifically, two internal surfaces (that is, facing the inside of the square delimited by the four columns 14-17) and two external surfaces (that is, facing the outside of the square delimited by the four columns 14-17), which are parallel and opposite to each other two by two (in other words, each column 14-17 has two external surfaces that are perpendicular to each other and two internal surfaces that are perpendicular to each other, each internal surface being parallel to the corresponding external surface). The column 14 is rigidly connected to the stationary frame 12 (i.e. it is integral with the stationary frame 12) and therefore does not make any displacement with respect to the stationary frame 12 when the feeler 2 moves. The column 15 is opposite to the column 14 (that is, it is arranged at the opposite vertex of the square delimited by the four columns 14-17 with respect to the column 14), supports the feeler 2 (that is, it supports the rod 6 on which the feeler 2 is rigidly mounted), and is adapted to translate (together with the feeler 2 to which it is rigidly connected) along both measuring directions D1 and D2. The column 16 is placed between the columns 14 and 15 and translates only when the column 15 (that is, the feeler 2 supported by the column 15) moves along the measuring direction D1. In particular, the displacement of the column 16 occurs almost exclusively, or substantially only, along the measuring direction D1. Indeed, the main component of the displacement of the column 16 is that one in the measuring direction D1, while the component of the displacement in the measuring direction D2 is negligible and can be possibly compensated. In other words, when the feeler 2 moves along the measuring direction D1, the column 16 performs a corresponding, substantial displacement along the measuring direction D1 and a displacement of negligible entity along the measuring direction D2. The column 17 is placed between the columns 14 and 15 on the opposite side with respect to the column 16 and translates only when the column 15 (i.e. the feeler 2 supported by the column 15) moves along the measuring direction D2. In particular, the displacement of the column 17 occurs almost exclusively, or substantially only, along the measuring direction D2. Indeed, the main component of the displacement of the column 17 is that one along the measuring direction D2, while the displacement component in the measuring direction D1 is negligible and can be possibly compensated. In other words, when the feeler 2 is moved along the measuring direction D2, the column 17 performs a corresponding, substantial displacement along the measuring direction D2 and a negligible displacement along the measuring direction D1.

The two position sensors 3a and 3b (partially visible in FIGS. 5 and 6) are mounted on the deformable mechanism 13 to detect each the position of the feeler 2 along a corresponding measuring direction D1 or D2. In particular, the position sensor 3a comprises a stationary part which is rigidly connected to the stationary frame 12 and a movable part which is rigidly connected to the column 16 in order to detect the displacement of the column 16 along the measuring direction D1. Similarly, the position sensor 3b comprises a stationary part which is rigidly connected to the stationary frame 12 and a movable part which is rigidly connected to the column 17 to detect the displacement of the column 17 along the measuring direction D2. According to a preferred (but not binding) embodiment, the position sensors 3a and 3b comprise transducers, for example LVDT ("Linear Variable Displacement Transducer"), each of which comprises windings fixed to the stationary frame 12 and a movable core housed in the windings and integral with a stem fixed to the column 16 or to the column 17.

According to an alternative and perfectly equivalent embodiment, herein not illustrated, the two unidirectional position sensors 3a and 3b are replaced by a single bidirectional position sensor which is mechanically coupled directly to the column 15, that is it comprises a stationary part which is rigidly constrained to the stationary frame 12 and a movable part which is rigidly connected to the column 15 to detect the displacement of the column 15 along both measuring directions D1 and D2.

As an alternative, the transducers mentioned above can be of a different type, for example of optical type.

The deformable mechanism 13 comprises deformable linking elements 18-25 which link the columns 14-17 to each other by guiding their displacements.

More particularly, the deformable mechanism 13 described herein and illustrated in the figures comprises four elastically deformable external crosspieces 18-21, each of which runs parallel to a measuring direction D1 or D2, is rigidly constrained to external surfaces of two corresponding columns 14-17 (by means of respective screws screwed into threaded holes of the columns 14-17), and connects the two corresponding columns 14-17 to each other. In particular, the external crosspiece 18 connects the columns 14 and 16 to each other and runs parallel to the measuring direction D2, the external crosspiece 19 connects the columns 14 and 17 to each other and runs parallel to the measuring direction D1, the external crosspiece 20 connects the columns 15 and 16 to each other and runs parallel to the measuring direction D1 (therefore it is parallel and opposite to the external crosspiece 19), and the external crosspiece 21 connects the columns 17 and 15 to each other and runs parallel to the measuring direction D2 (therefore it is parallel and opposite to the external crosspiece 18). The external crosspieces 18-21 are parallel and opposite to each other two by two. In addition, the height of all four external 18-21 crosspieces, measured perpendicular to the measuring direction D1 e D2, may be, even if not essential, substantially the same as the height of the columns 14-17. According to a preferred (but not binding) embodiment shown in the attached drawings, each external crosspiece 18-21 has through holes which serve, among other things, to lighten the external crosspieces 18-21 and to reach some of the internal components.

The deformable mechanism 13 comprises four internal, elastically deformable crosspieces 22-25, each of which runs parallel to a measuring direction D1 or D2, it is rigidly constrained to internal surfaces of two corresponding columns 14-17 (by means of respective screws screwed into threaded holes of the columns 14-17), and links the two corresponding columns 14-17 to each other. In particular, the internal crosspiece 22 links the columns 14 and 17 to each other and runs parallel to the measuring direction D1, the internal crosspiece 23 links the columns 15 and 16 to each other and runs parallel to the measuring direction D1 (therefore it is parallel and opposite to the internal crosspiece 22), the internal crosspiece 24 links the columns 14 and 16 to each other and runs parallel to the measuring direction D2, and the internal crosspiece 25 links the columns 17 and 15 to each other and runs parallel to the measuring direction D2 (therefore it is parallel and opposite to the internal crosspiece 24). The internal crosspieces 22-25 are parallel and opposite two by two. In addition, the height all four internal crosspieces 22-25, measured perpendicular to the measuring direction D1 e D2, may be different, for example much lower than the height of the columns 14-17 (this design choice has the only aim to limit the overall dimensions inside the deformable mechanism 13).

As previously stated, the four columns 14-17 are arranged at the vertices of a square and consequently the four external crosspieces 18-21 all have the same length taken parallel to one of the measuring directions D1 and D2. Similarly, the four internal crosspieces 22-25 all have the same length taken parallel to one of the measuring directions D1 and D2. In other words, all four external crosspieces 18-21 have the same dimensions (and are identical to each other so much so that they are interchangeable) and all four internal crosspieces 22-25 have the same size (and are identical to each other so much so that they are interchangeable).

According to a different and substantially equivalent embodiment, not illustrated, the four columns 14-17 are arranged at the vertices of a rectangle (not a square) the dimensions of which are larger along one of the two measuring directions D1 and D2.

Figure 7:
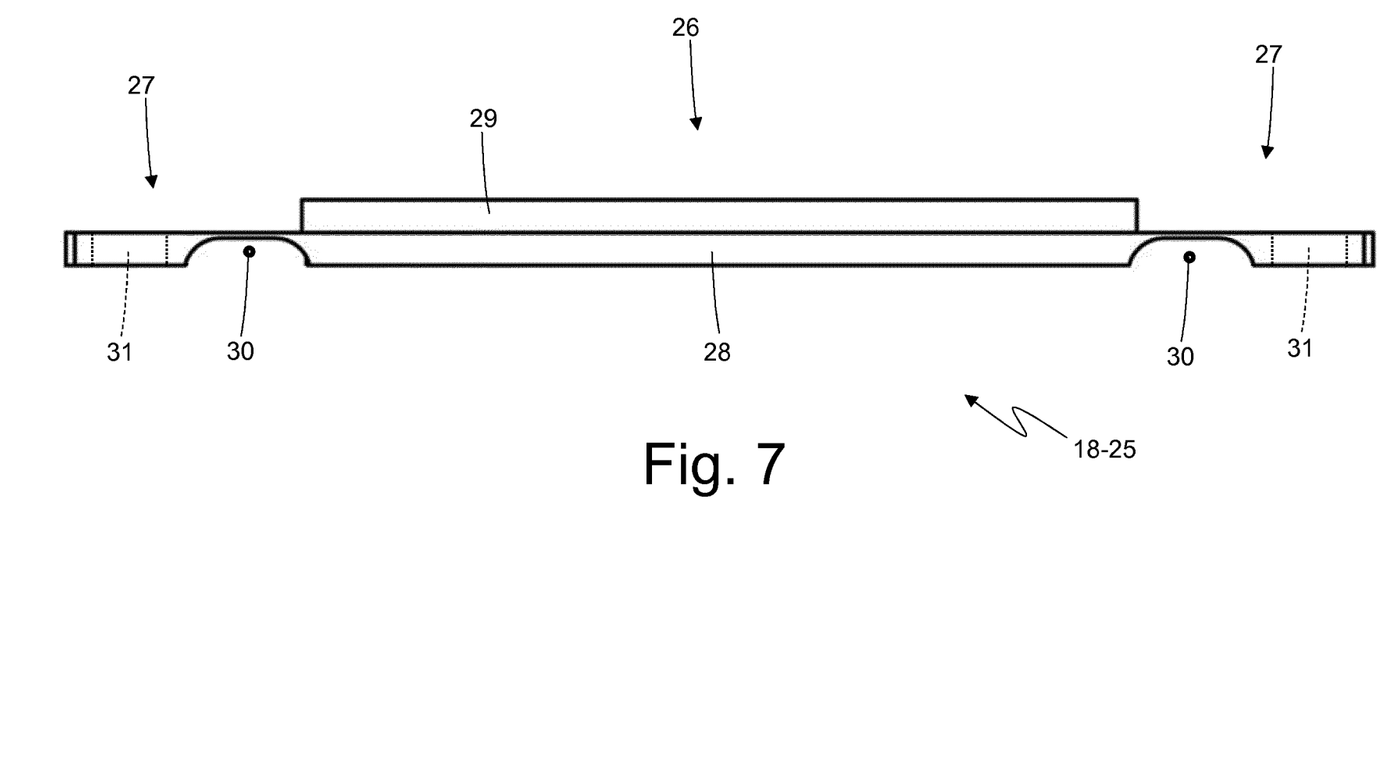
FIG. 7 is a plan view of a crosspiece of the deformable mechanism of FIGS. 3 and 4.

As it is better illustrated in FIG. 7, each crosspiece 18-25 (either external or internal) has a central portion 26 placed between the two corresponding columns 14-17 and two lateral portions 27, which are placed on opposite sides of the central portion 26, are constrained to the corresponding columns 14-17 and have a lower thickness than the central portion 26. According to a preferred (but not binding) embodiment illustrated in the accompanying figures, each crosspiece 18-25 comprises a main element 28 extending from one end to the other of the crosspiece 18-25 and defines both the lateral portions 27 and one part of the central portion 26, and a reinforcing element 29 which is centrally located, defines another part of the central portion 26 and is rigidly constrained (for example welded) to the main element 28. According to the embodiment (not limiting) illustrated in the attached figures, the reinforcing element 29 has the same thickness as the main element 28 and thus the thickness of central portion 26 is twice that of the lateral portions 27.

Near the point at which it is constrained to a corresponding column 14-17 (that is, at one of the lateral portions 27), each crosspiece 18-25 has a weakening area 30, that is a reduced-thickness area, to locally increase the flexibility of the crosspiece 18-25 itself. The weakening area 30 consists of a recess which locally reduces the cross section of the crosspiece 18-25 and increases its flexibility near each column to which it is rigidly constrained (by way of example, at the weakening area 30 the thickness of the crosspiece 18-25 is comprised between 20% and 35% of the thickness of the remaining part of the lateral portion 27). According to a preferred (but not binding) embodiment illustrated in the attached figures, each weakening area 30 is placed entirely in the lateral portion 27 and starts at the boundary zone between the lateral portion 27 and the central portion 26. Furthermore, each weakening area 30 is arranged entirely in the lateral portion 27 between the central portion 26 and a through hole 31, in which a fastening screw is inserted to fasten the crosspiece to the corresponding column 14-17.

From what has been described above, it is clear that each crosspiece 18-25 has an elastic flexibility which is concentrated near the columns 14-17 (that is, at the weakening area 30). Thanks to this elastic flexibility the deformable mechanism 13 can deform elastically in both measuring directions D1 and D2, thus enabling the feeler 2 (rigidly constrained to the column 15) to move in both measuring directions D1 and D2.

According to a preferred embodiment, the deformable mechanism 13 comprises two balancing elements 60, each of which is centrally hinged to the stationary frame 12 by means of suitable hinge mechanisms to rotate about a rotation axis 33 perpendicular to the measuring directions D1 and D2. The two balancing elements 60 are arranged perpendicular to each other, more specifically they extend along directions that are perpendicular to each other, and the two rotation axes 33 are parallel to each other. In the embodiment described and shown in the figures, the two rotation axes 33 are not coincident, i.e. they are arranged at a certain distance, different from zero, from each other. Moreover, the two balancing elements 60 are arranged at different heights, taken perpendicular to the measuring directions D1 and D2, so as to be overlapped and spaced from each other. In particular, the stationary frame 12 comprises a support plate 34, which is integral with the column 14, is arranged parallel to both the measuring directions D1 and D2, carries the hinge mechanisms of the two balancing elements 60, and is located between the two balancing elements 60. In the embodiment shown in the figures, the internal crosspieces 22-25 are arranged in such a way that two internal crosspieces, both parallel to one of the two measuring directions D1 or D2, are located on one side of the support plate 34 and the other two internal crosspieces, both parallel to the other of the two measuring directions D1 or D2, are on the opposite side of the support plate 34. In particular, with reference to FIGS. 3 and 4, the internal crosspieces 22 and 23 which connect the columns 14 and 17 and 15 and 16 respectively and are parallel to the measuring direction D1 are placed on one side of the support plate 34 (above said plate according to the orientation shown in FIG. 3), while the other two internal crosspieces 24 and 25 which connect the columns 14 and 16 and 15 and 17 respectively and are parallel to the measuring direction D2 are located on the opposite side of the support plate 34 (above the plate according to the orientation shown in FIG. 4). Each balancing element 60 has a first end which is mechanically constrained to the column 16 or to the column 17 (that is, a balancing element 60 is mechanically constrained to the column 16 and the other balancing element 60 is mechanically constrained to the column 17). According to a preferred (but not binding) embodiment shown in the accompanying figures, the first end of each balancing element 60 is mechanically constrained to the corresponding column 16 or 17 by means of a connecting rod 35 which is hinged on one side to the first end of the balancing element 60 and on the other side to the corresponding column 16 or 17. According to an alternative embodiment, each balancing element 60 can be constrained to the corresponding column 16 or 17 by means of an elastic metal lamina which has one end connected to the end of the respective balancing element 60 and the other end fixed (for example screwed) to a rigid support element integral with the respective column 16 or 17. This allows to eliminate clearances which are inevitably present in a connection made by means of a connecting rod.

Each balancing element 60 performs a rotation about its rotation axis 33 when the column 16 or 17 to which it is constrained moves along the respective measuring direction D1 or D2. With reference to the embodiment described and illustrated herein, the balancing element 60 shown in FIG. 3 rotates about the rotation axis 33 when the column 17, to which it is constrained, performs a displacement. Since, as previously stated, the column 17 displaces almost exclusively along the measuring direction D2, the balancing element 60 shown in FIG. 3 rotates when the feeler 2 moves along the measuring direction D2. The balancing element 60 shown in FIG. 4, on the other hand, performs a rotation only when the column 16 to which it is constrained performs a displacement. Since the column 16 displaces almost exclusively along the measuring direction D1, the balancing element 60 shown in FIG. 4 rotates when the feeler 2 moves along the measuring direction D1. The simultaneous rotation of the balancing elements 60 occurs when the displacement of the feeler 2 comprises both a component in the measuring direction D1 and a component in the measuring direction D2.

Each balancing element 60 comprises an arm 32 and inertial compensation counterweight 36 with a calibrated mass rigidly coupled to the arm 32 at a second end of the balancing element 60 which is opposite to the first end (mechanically constrained to the corresponding column 16 or 17). The counterweight 36 is fixed to the arm 32 by means of an adjustable mechanical connection which enables to adjust the position of the counterweight 36 as a function of the feeler 2 and of the rod 6 to which it is fixed, more specifically as a function of their total weight. The counterweight 36 can also be replaced, within certain ranges related to space reasons, with a counterweight with different mass and dimensions depending on the weight of the rod and the feeler.

When the column 16 or 17 moves along the corresponding measuring direction D1 or D2, the relative balancing element 60 (constrained to the column 16 or 17 by means of the connecting rod 35) rotates about the rotation axis 33.

The presence of the counterweights 36 guarantees a balancing of the whole system (which comprises the deformable mechanism 13, the feeler 2 and the rod 6 to which the feeler is connected) in both the measuring directions D1 and D2. The balancing of the system is obtained thanks to the fact that the moments of the forces applied to the system are the same with respect to the rotation axis 33 about which each balancing element 60 rotates. In other words, the product of the force exerted as a whole by the feeler 2, the rod 6 and the portion of the deformable mechanism 13 connected to the column 16 or 17 and of the distance between the first end of the balancing element 60 constrained to the column 16 or 17 and the rotation axis 33 is equal to the product of the force exerted by the counterweight 36 and of the distance between the rotation axis 33 and the center of gravity of the counterweight 36. The balancing of the system takes effect whenever the measuring head 1 is subjected to a translational acceleration. For example, the counterweight 36 of each balancing element 60 serves its function when the measuring head 1 is mounted vertically, that is when the plane containing the measuring directions D1 and D2 lies perpendicular to the ground. In this case the function of the counterweight 36 is to counterbalance the gravity force both when the measuring head 1 is in the working position and when it is in the rest position to preserve the balance of the system. The counterweight 36 also serves its function during transits, regardless of the positioning of the measuring head 1, ensuring the balance of the system even if a high acceleration is applied.

According to the preferred embodiment herein described and illustrated, the counterweight 36 has the particular shape shown in the figures wherein the mass is distributed in such a way as to obtain a volume as small as possible depending on the dimensions imposed by the deformable mechanism 13 (the counterweight 36 must not impact against the crosspieces 22-25 during the rotation) and the need to maintain the center of gravity as far as possible from the rotation axis 33.

Figure 8:
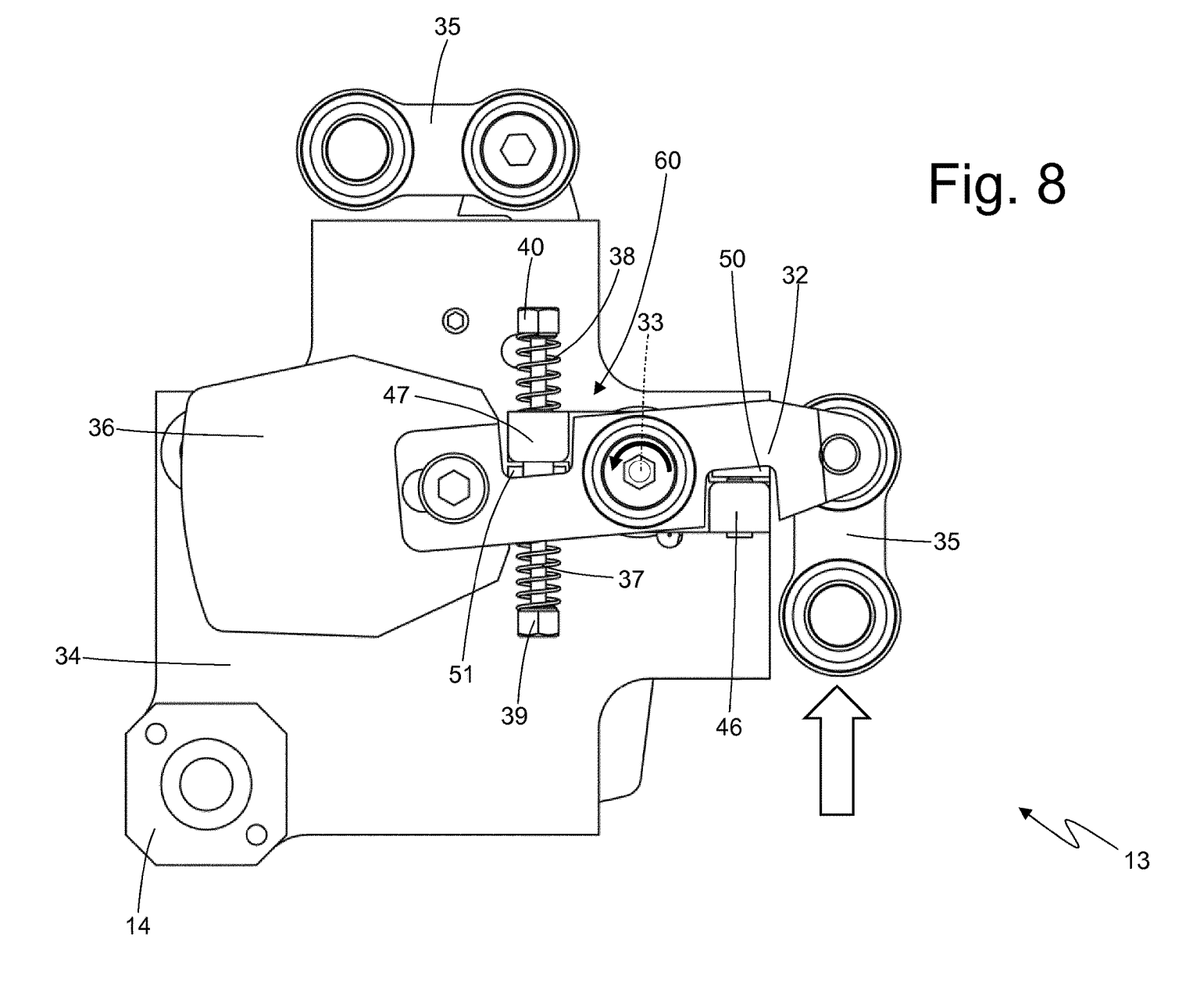
FIGS. 8 and 9 are two plan views of a counterweight and a preloading system of the deformable mechanism of FIGS. 3 and 4 in two opposite end positions.
Figure 9:
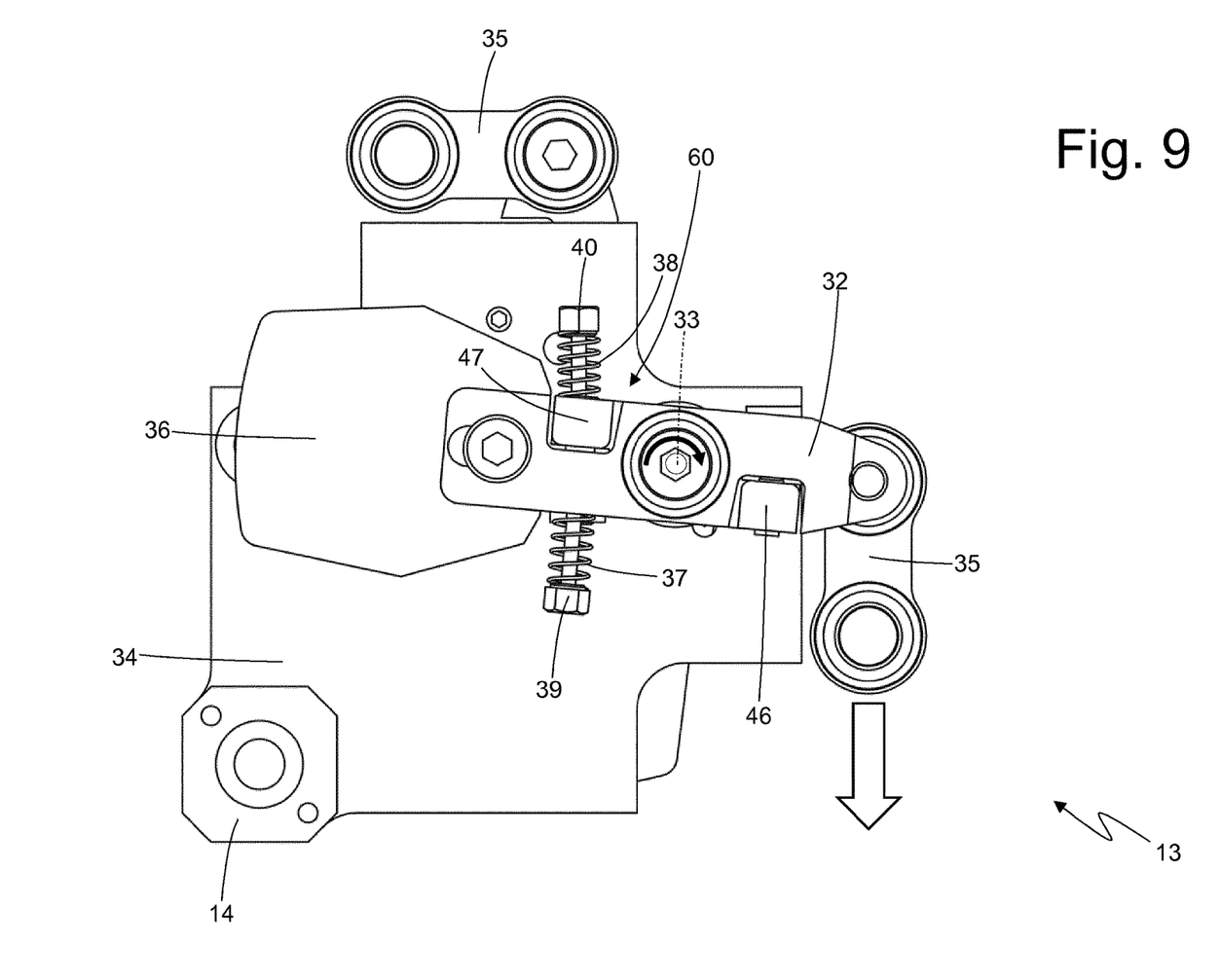

According to what is illustrated in FIGS. 8 and 9 (representing for the sake of simplicity a single balancing element 60 hinged to the support plate 34 of the stationary frame 12), each balancing element 60 is mechanically connected to two opposite elastic elements 37 and 38 which tend to keep the balancing element 60 in an intermediate balanced position. According to a preferred embodiment, each elastic element 37 or 38 comprises a helical spring which partially houses the shank of a screw 39 or 40. Each screw 39 or 40 has a head which serves as abutment against which the elastic element 37 or 38 is compressed. In other words, one end of each elastic element 37 or 38 leans against the head of the corresponding screw 39 or 40 in such a way that the elastic element 37 or 38 can be compressed against the head of the corresponding screw 39 or 40.

Figure 10:
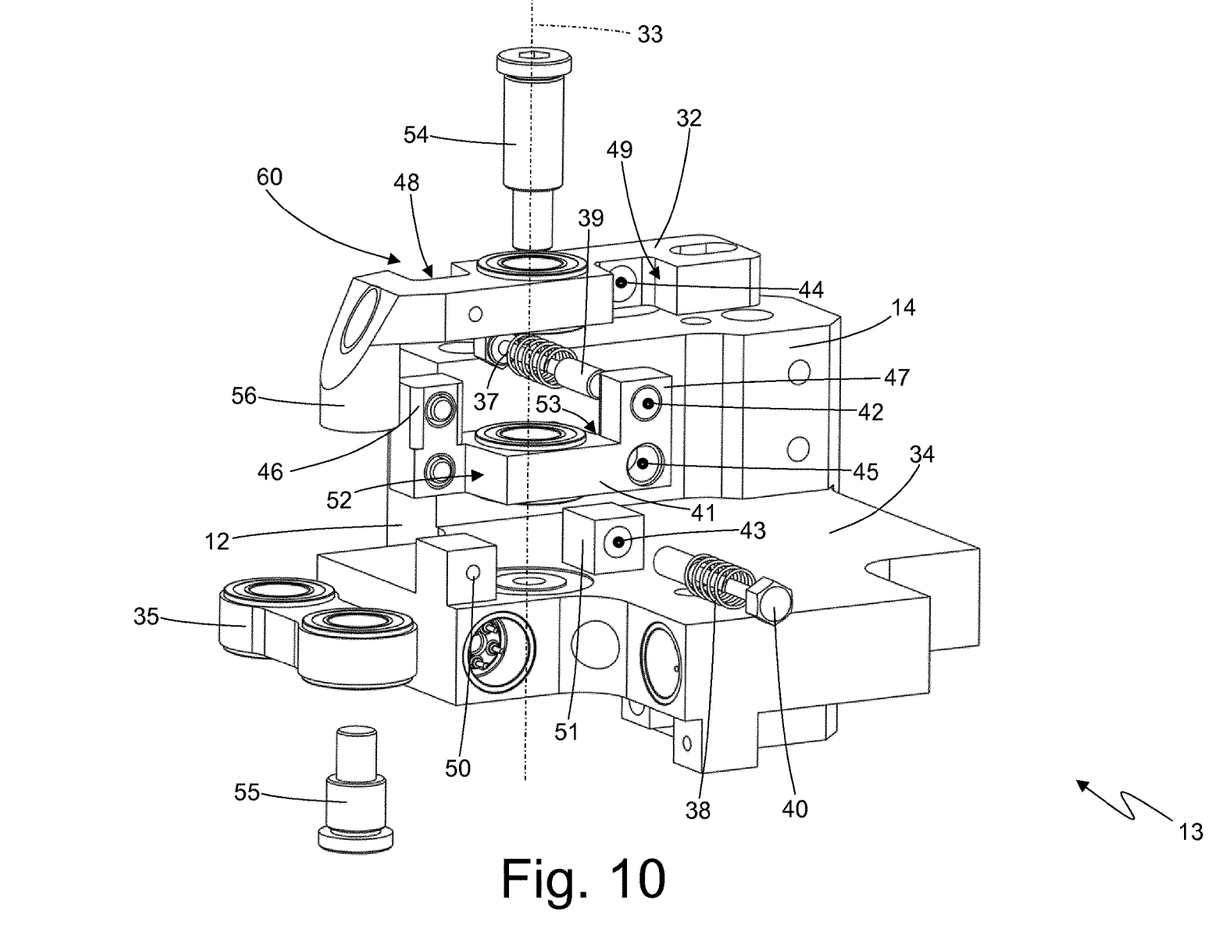
FIG. 10 is a perspective and exploded view of the counterweight and preloading system of FIGS. 8 and 9 where a counterweight mass has been removed.

As shown more clearly in FIG. 10, each balancing element 60 is coupled to a unidirectional preloading lever 41 which is hinged to the stationary frame 12, more specifically to the support plate 34, to rotate about the rotation axis 33 of the corresponding balancing element 60 (that is, the balancing element 60 and the unidirectional preloading lever 41 are adapted to rotate about the same rotation axis 33). Each unidirectional preloading lever 41 is adapted to rotate with respect to the balancing element 60 in a first sense, and is prevented from rotating with respect to the balancing element 60 in a second sense opposite to the first sense (in a way that is described below). In addition, each unidirectional preloading lever 41 is adapted to rotate with respect to the stationary frame 12 (that is, with respect to the support plate 34 of the stationary frame 12) in the second sense, and is prevented from rotating with respect to the stationary frame 12 (that is, with respect to the support plate 34 of the stationary frame 12) in the first sense opposite to the second sense (in a way that is described below). More specifically, in the second sense the unidirectional preloading lever 41 rotates with respect to the stationary frame 12 together with the balancing element 60.

The screw 40 supporting the elastic element 38 compressed between the head of the screw 40 and the unidirectional preloading lever 41 is screwed into a threaded hole 43 housed in the stationary frame 12, and the screw 39 supporting the elastic element 37 compressed between the screw head 39 and the balancing element 60 is screwed into a threaded hole 42 provided in the unidirectional preloading lever 41.

The screw 39 crosses a through hole 44 in the balancing element 60, more specifically in the arm 32 of the balancing element 60, and does not contact the balancing element 60. Similarly, the screw 40 crosses a through hole 45 in the unidirectional preloading lever 41 and does not contact the unidirectional preloading lever 41. According to a preferred embodiment illustrated in the attached drawings, each unidirectional preloading lever 41 is placed below the corresponding balancing element 60, that is between the balancing element 60 and the support plate 34 of the stationary support 12, and comprises two first overhangs 46 and 47, or movable overhangs, running parallel to the rotation axis 33, which overhang from the unidirectional preloading lever 41 and engage two corresponding seats 48 and 49 which are U-shaped and are provided in the overlying balancing element 60, more specifically in the arm 32 of the balancing element 60. The threaded hole 42 into which the screw 39 is screwed is provided in the movable overhang 47. The stationary frame 12 (in particular the support plate 34 of the stationary frame 12) is placed under each unidirectional preloading lever 41 and has two second overhangs 50 and 51, or stationary overhangs, running parallel to the rotation axis 33, which overhang from the stationary frame 12 and engage two corresponding seats 52 and 53 which are L-shaped and provided in the overlying unidirectional preloading lever 41; the threaded hole 43 into which the screw 40 is screwed is provided in the stationary overhang 51.

Due to the presence of the two movable overhangs 46 and 47 of each unidirectional preloading lever 41 which engage the corresponding seats 48 and 49 of each balancing element 60, the balancing element 60 can rotate about the rotation axis 33 and with respect to the unidirectional preloading lever 41 in a first sense according to which both the seats 48 and 49 move away from the corresponding movable overhangs 46 and 47 (as shown in FIG. 8 in which a relative rotation between the balancing element 60 and the unidirectional preloading lever 41 occurs). The balancing element 60 can also rotate about the rotation axis 33 integrally with the unidirectional preloading lever 41 in a second sense (opposite to the first sense) according to which both the movable overhangs 46 and 47 of the unidirectional preloading lever 41 engage the walls of the corresponding seats 48 and 49 of the balancing element 60 by "dragging" the unidirectional preloading lever 41 in the rotational movement (as shown in FIG. 9 wherein the balancing element 60 and the unidirectional preloading lever rotate jointly 60).

Due to the presence of the two stationary overhangs 50 and 51 which engage the corresponding seats 52 and 53 of each unidirectional preloading lever 41, the unidirectional preloading lever 41 is prevented from rotating about the rotation axis 33 and with respect to the stationary frame 12 in the first sense according to which both seats 52 and 53 "knock" against the corresponding stationary overhangs 50 and 51. The unidirectional preloading lever 41 can rotate about the rotation axis 33 and with respect to the stationary frame 12 in the second sense according to which both the seats 52 and 53 move away from the corresponding stationary overhangs 50 and 51.

A pair of pins 54 is provided, each of which enter corresponding through holes provided in the respective balancing element 60, more specifically in the arm 32 of such balancing element 32, and in the respective unidirectional preloading lever 41 to enable the balancing element 60 and the unidirectional preloading lever 41 to rotate about the rotation axis 33. A second pin 55 passes through a through hole of each connecting rod 35 and enters a cavity 56 provided in one end of the corresponding balancing element 60 to provide a rotational coupling between the connecting rod 35 and the balancing element 60.

As illustrated in FIG. 8, when the connecting rod 35 moves in a first direction (upward in FIG. 8), the balancing element 60 rotates in the first direction (counterclockwise in FIG. 8) about the rotation axis 33 to accompany the movement of the connecting rod 35 while the unidirectional preloading lever 41 does not move (or does not rotate about the rotation axis 33) because it is stopped by the mechanical constraints imposed by the stationary overhangs 50 and 51 (only partially visible in FIG. 8). In this situation, the elastic element 38 is not affected by any stress (as it lies between the head of the screw 40, integral with the stationary frame 12, and the unidirectional preloading lever 41 that does not move), while the elastic element 37 is compressed (as it is placed between the head of the screw 39, integral with the unidirectional preloading lever 41 that does not move, and the balancing element 60, which instead moves).

As illustrated in FIG. 9, when the connecting rod 35 moves in a second sense, for example opposite to that one described above (downwards in FIG. 9) the balancing element 60 rotates in the second sense (clockwise in FIG. 8) about the rotation axis 33 to accompany the movement of the connecting rod 35 and also the unidirectional preloading lever 41 rotates about the rotation axis 33 together with the balancing element 60. As a consequence, the balancing element 60 and the unidirectional preloading lever 41 rotate together in the second sense (clockwise in FIG. 9) with respect to the stationary frame 12. In this situation, the elastic element 38 is compressed (because it is placed between the head of the screw 40 integral with the stationary frame 12 and the preloading lever unidirectional 41 that moves), while the elastic element 37 is not affected by any stress (as it lies between the head of the screw 39 integral with the unidirectional preloading lever 41 and the balancing element 60 that both move with the same law of motion).

According to a possible embodiment not illustrated, a first abutment element constitutes an end stop along the measuring direction D1 and limits the stroke of the column 16 along the measuring direction D1 itself (in particular the first abutment element is shaped so as to limit the stroke of the column 16 in both directions, that is it constitutes both a right end stop and a left end stop). Similarly, a second abutment element constitutes an end stop along the measuring direction D2 and limits the stroke of the column 17 along the measuring direction D2 itself (in particular the second abutment element is shaped so as to limit the stroke of the column 17 in both directions, that is it constitutes both a right end stop and a left end stop). According to a possible embodiment, the two abutment elements are both coupled directly to the column 15 (that is, both act directly on the column 15); this prevents any impacts suffered by the feeler 2 or by the rod 6 from being transmitted to other components of the deformable mechanism 13 and urging the deformable mechanism 13 itself. It also possible to provide a single abutment element coupled to the column 15, for example a pin of appropriate size, which by engaging properly with the stationary frame 12, for example with a hole enabling the pin to move with a certain clearance, limits the stroke of the column 15 in both senses along both measuring directions D1 and D2.

According to a possible embodiment not illustrated, a single damping element (for example provided with a viscous fluid) can be mechanically coupled to the column 15 to dampen the translational movement of the column 15 along both measuring directions D1 and D2. Alternatively, a first damping element can be mechanically coupled to the column 16 to dampen the translational movement of the column 16 along the measuring direction D1 and a second damping element can be mechanically coupled to the column 17 to dampen the translational movement of the column 17 along the measuring direction D2. The function of the damping elements is to prevent the generation of significant oscillations in the feeler 2 along the measuring directions D1 and D2 during the checking phase, thus ensuring a greater stability, and when the measuring head 1 returns to its rest position at the end of the checking cycle.

In the measuring head 1 so far described and illustrated in the figures, the balancing elements 60 with the respective counterweights 36, the unidirectional preloading levers 41 and the internal crosspieces 22-25 are placed on opposite sides of the support plate 34 and thus, in general, on different geometrical planes. According to an alternative embodiment it is possible to design the deformable mechanism 13 in such a way that all its components lie, in general, on a single plane, for example on the same side of the support plate 34. In particular, by sizing suitably the different components, namely the external crosspieces 18-21 and the internal crosspieces 22-25 and the balancing elements 60, for instance by employing counterweights 36 with appropriate calibrated mass and size, it is possible to fix both the balancing elements 60, while maintaining the mutual arrangement at 90°, to the same face of the support plate 34 so that they are arranged at the same height measured perpendicularly to the measuring directions (D1, D2). According to a further alternative embodiment (not shown), the columns (14-17) and the external crosspieces (18-21) and the internal crosspieces (22-25) can be realized in a single piece, for example, machined from solid.

According to a different embodiment (not illustrated), as an alternative to the deformable mechanism so far described, the kinematic motion assembly 13 comprises sliding elements, for example four carriages each of which is linked to two columns to enable them to perform reciprocal, exclusively linear movements along one of the measuring directions D1 and D2 as a function of the displacements of the feeler.

The measuring head 1 above described provides several advantages.

In the first place, the behavior of the measuring head 1 described above is perfectly homogenous from the inertial point of view. In other words, along both measuring directions D1 and D2 the inertia of the measuring head 1 described above is identical. The measuring head 1 can also be considered to be isotropic, namely having an identical (homogeneous) behavior in the plane defined by the measuring directions D1 and D2. This allows to simplify the control of the movements of the measuring head 1 both during the phase of dimensional and/or geometric checking of the mechanical piece and during the transits, because it is possible to apply to the measuring head 1 the same acceleration in all directions. In addition, the particular configuration of the deformable mechanism 13 and especially the presence of the counterweights 36 of inertial compensation guarantee a balance of the measuring head 1 in both measuring directions D1 and D2 and, consequently, the possibility of subjecting the measuring head 1 to even very high accelerations during the transits, thus minimizing the downtime of the measuring head 1 between one checking cycle and the other and increasing in general the efficiency of the measuring process.

Finally, the measuring head 1 described above is easy and inexpensive to manufacture, because its construction requires the use of conventional manufacturing technologies and materials (which can be easily found on the market).

The invention claimed is:

1. A bidirectional measuring head for dimensional and/or geometric checking of a mechanical piece, the measuring head comprises:
    a stationary frame;
    a feeler adapted to contact the mechanical piece;
    a kinematic motion assembly which is supported by the stationary frame and carries the feeler to enable the feeler to move along two measuring directions which are perpendicular to each other; and
    at least one sensor which is mounted on the kinematic motion assembly and detects the position of the feeler along at least one measuring direction;
    wherein the kinematic motion assembly comprises:
    a first column, rigidly connected to the stationary frame, a second column, opposite to the first column, which carries the feeler and moves along both the measuring directions together with the feeler, and a third column and a fourth column each of which displaces along one of the two measuring directions; and
    linking elements which link said columns by guiding their displacements.

2. The measuring head according to claim 1, wherein
said columns run perpendicular to said two measuring directions;
the third column only moves when the second column moves along the first measuring direction by displacing almost exclusively along the first measuring direction; and
the fourth column only moves when the second column moves along the second measuring direction by displacing almost exclusively along the second measuring direction.

3. The measuring head according to claim 2, wherein the kinematic motion assembly is a deformable mechanism.

4. The measuring head according to claim 2, wherein the four columns are arranged at the vertices of a rectangle.

5. The measuring head according to claim 2 further comprising two balancing elements, each of which is hinged to the stationary frame by means of respective hinge mechanisms to rotate about a rotation axis perpendicular to the measuring directions and has a first end mechanically constrained to the third column or to the forth column.

6. The measuring head according to claim 5, wherein each balancing element includes a counterweight with a calibrated mass at a second end which is opposite to the first end.

7. The measuring head according to claim 6, wherein each balancing element includes an arm and each counterweight is fixed to the corresponding arm by an adjustable mechanical connection.

8. The measuring head according to claim 1, wherein the kinematic motion assembly is a deformable mechanism.

9. The measuring head according to claim 1, wherein the linking elements comprise elastically deformable crosspieces which are rigidly constrained to said columns.

10. The measuring head according to claim 9, wherein said columns each comprises at least one external surface, said elastically deformable crosspieces comprising four external crosspieces, parallel and opposite two by two, each of which runs parallel to the corresponding measuring direction, is rigidly constrained to said at least one external surface of two corresponding columns and links said two corresponding columns to each other.

11. The measuring head according to claim 10, wherein said columns each comprises at least one internal surface, said elastically deformable crosspieces comprising four internal crosspieces, parallel and opposite two by two, each of which runs parallel to the corresponding measuring direction, is rigidly constrained to said at least one internal surface of two corresponding columns and links said two corresponding columns to each other.

12. The measuring head according to claim 11, wherein said at least one internal surface of each of said columns is parallel and opposite to said at least one external surface of said column.

13. The measuring head according to claim 9, wherein each crosspiece of said elastically deformable crosspieces includes a reduced-thickness area to locally increase the flexibility of said crosspiece near each column to which the crosspiece is rigidly constrained.

14. The measuring head according to claim 1, wherein the stationary frame comprises a support plate, which is integral with the first column and is arranged parallel to both the measuring directions.

15. The measuring head according to claim 1, wherein the four columns are arranged at the vertices of a rectangle.

16. The measuring head according to claim 1 further comprising two balancing elements, each of which is hinged to the stationary frame by respective hinge mechanisms to rotate about a rotation axis perpendicular to the measuring directions and has a first end mechanically constrained to the third column or to the forth column.

17. The measuring head according to claim 16, wherein said two balancing elements are arranged perpendicular to each other.

18. The measuring head according to claim 16, wherein the two balancing elements are arranged at different heights taken perpendicular to the measuring directions.

19. The measuring head according to claim 16, wherein the stationary frame comprises a support plate, which is integral with the first column, is arranged parallel to both the measuring directions, carries the hinge mechanisms for the two balancing elements, and is arranged between said two balancing elements.

20. The measuring head according to claim 16, wherein each balancing element includes a counterweight with a calibrated mass at a second end which is opposite to the first end.

21. The measuring head according to claim 20, wherein each balancing element includes an arm and each counterweight is fixed to the corresponding arm by an adjustable mechanical connection.

22. The measuring head according to claim 16, wherein the first end of each balancing element is mechanically constrained to the corresponding column by a connecting rod, which has one end hinged to the first end of the balancing element and the other end hinged to the corresponding column.

23. The measuring head according to claim 16, wherein each balancing element is mechanically connected to at least one elastic element tending to keep the balancing element in an intermediate balanced position.

24. The measuring head according to claim 16, wherein
each balancing element is coupled to a unidirectional preloading lever which is hinged to the stationary frame to rotate about the rotation axis of the corresponding balancing element; and
each unidirectional preloading lever is prevented from rotating with respect to the stationary frame in a first sense, and is adapted to rotate with respect to the stationary frame, together with the balancing element, in a second sense opposite to the first sense.

25. The measuring head according to claim 24, wherein each unidirectional preloading lever has two movable overhangs, running parallel to the rotation axis, which overhang from the unidirectional preloading lever and engage two corresponding seats provided in the respective balancing element.

26. The measuring head according to claim 24, wherein the stationary frame comprises two stationary overhangs, running parallel to the rotation axis, which overhang from the stationary frame and engage two corresponding seats provided in the unidirectional preloading lever.

* * * * *